United States Patent [19]

Kreft

[11] Patent Number: 4,549,176

[45] Date of Patent: Oct. 22, 1985

[54] DEVICE FOR IDENTIFYING AN INFORMATION PARTICULARLY AN ELECTRONIC LOCK/KEY COMBINATION

[75] Inventor: Hans-Dietrich Kreft, Reinbek, Fed. Rep. of Germany

[73] Assignee: Angewandte Digital Elektronik GmbH, Fed. Rep. of Germany

[21] Appl. No.: 481,385

[22] Filed: Apr. 1, 1983

[51] Int. Cl.[4] ........................ H04Q 9/00; E05B 49/00

[52] U.S. Cl. .......................... 340/825.31; 340/825.54; 361/172

[58] Field of Search ...................... 340/825.31, 825.54, 340/310 R, 310 A; 361/172

[56] References Cited

U.S. PATENT DOCUMENTS

| | | | |
|---|---|---|---|
| 3,440,633 | 4/1969 | Vinding | 340/825.54 |
| 3,714,419 | 1/1973 | Fosse et al. | 340/310 R |
| 3,721,830 | 3/1973 | Oishi et al. | 340/310 R |
| 4,328,482 | 5/1982 | Belcher et al. | 340/310 A |
| 4,371,867 | 2/1983 | Gander | 340/310 R |
| 4,388,524 | 6/1983 | Walton | 340/825.31 |

*Primary Examiner*—Donald J. Yusko
*Attorney, Agent, or Firm*—Hill, Van Santen, Steadman & Simpson

[57] ABSTRACT

Device for identifying an information, particularly of an access control consisting of electronic lock and key part, wherein given approach of the key part toward the lock part, its oscillator part oscillates at a high frequency, the oscillation is picked up by the key part and, modulated with a frequency or pulse pattern serving as a key identifier, is transmitted back to the lock part and is further processed by the reception and recognition means at the lock side. The reciprocating transmission of the energy between the lock and key part is carried out by a wave coupling by means of antenna coils whereby an inductively coupled synchronization switch is produced in that an altered signal curve is produced at a first coil at the lock side, being produced, for example, by means of a more or less complete short at a second coil at the key side or by means of impressing energy on the second coil.

9 Claims, 10 Drawing Figures

DEVICE FOR IDENTIFYING AN INFORMATION PARTICULARLY AN ELECTRONIC LOCK/KEY COMBINATION

BACKGROUND OF THE INVENTION

1. Field of the Invention

The present invention relates to locking means and more particularly to electronic locking means.

2. Description of the Prior Art

Electronic locking means are known in the art in which there is an interaction between the key part and the lock part.

Specifically, a device for identifying information allocated to a first carrier component (key part) with the assistance of read means which are disposed at a second carrier component (lock part) is known from the German OS 26 57 182. In that patent, a device is disclosed in which the information is contained encoded in a first information carrier in said first carrier component and the first carrier component also exhibits a reception element and a signal generator influenceable by the first information carrier. The second carrier component likewise exhibits a reception element as well as an evaluation circuit containing a second information carrier. The second carrier component is connected to an energy source which can be placed in an energetic coupling with the reception element of the first carrier component for the purpose of transmitting the energy for activating the components of the first carrier component and for driving the first information carrier.

By this means, the signal generator emits an information signal impressed by the information of the first information carrier which is received by the reception element in the second carrier component and, if need be after conversion, is compared in the evaluation circuit to the reference information of the second information carrier, and whereby the evaluation circuit emits a characteristic output signal when first and second information have a desired relationship to one another.

Significant features of the above device are, among other things that an energy evaluation stage is allocated to the reception element in the first carrier component, that energy evaluation stage only initiating a drive of the first information carrier when the received energy exceeds a minimum value; complementary parts of an electronic signal generator are provided in the first and second carrier components; the electronic components of the first carrier component are a frequency and/or amplitude determining circuit part of the signal generator; the first carrier component contains an oscillator at whose input an impedance coil lies and the second carrier component exhibits a second impedance which can be coupled to the first impedance; and the impedance coils contain ferrites designed as ferrite antennas.

Given this known identification means realized in a lock/key combination, the following problems remain unresolved between the lock and key, namely that a signal impression at the key side must be recognized at the lock side; the signal impression at the key side must ensue at precisely predetermined points in time so that the lock side can concentrate only on these points in time and the lock side is synchronized in the signal recognition to the points in time at which the signals appear; and an encoded signal impression must ensue at the key side.

SUMMARY OF THE INVENTION

The present invention, whose aim is to resolve the above mentioned problems, provides an inductively coupled synchronization switch, whereby means are provided which effect a more or less complete short of the inductance coil or, respectively, an energy impression onto the signal of the coil so that an altered signal curve derives at points in time which are determined by a coincidence of counter events both on the part of the signal coil as well as on the part of the coil at the lock side.

A significant feature of execution consists therein that the short at the coil at the key side ensues over a diode, this offering the advantage that, depending on the circuitry of the diode, respectively one half wave, for example the positive, is not shorted but is available for counting the pulses, this guaranteeing that the switch at the key side is closed precisely at a point in time which is prescribed by the signal generators on the side of the coil at the lock side.

A further significant element of the inventive lock/key combination is seen wherein an electronics is built in at the key side which interrogates and counts the half waves allowed to pass by the aforementioned diode, whereby this electronics contains a coding with which points in time at which the switch shorting the coil at the key side becomes effective are determined.

These and further features of the invention according to the claims are explained in greater detail on the basis of FIGS. 1 through 7 illustrating sample embodiments.

DESCRIPTION OF THE PREFERRED EMBODIMENTS

Figure 1:
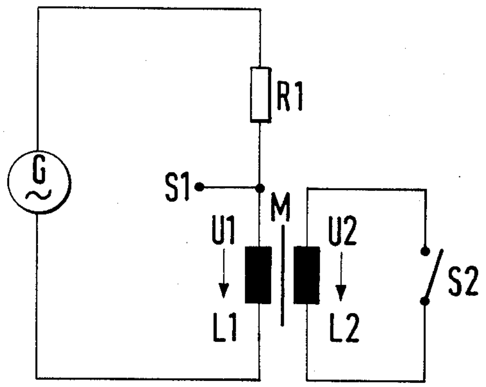
FIG. 1 is an electrical schematic incorporating the principles of the present invention showing an inductively coupled synchronization switch.

As shown in the circuit of FIG. 1, a periodic signal is conducted by a generator G over a resistor R1 and an inductance coil L1. The components mentioned above combined in this circuit belong to the lock side as they are applied to electronic lock/key combinations. A second inductance coil L2 which forms a part of the key side is coupled to the coil L1 at the lock side so that the corresponding signal curve with a phase shift derives at two coils. When the coil L2 is shorted over a switch S2, an altered signal curve derives not only on the part of the coil L2, this short is also encountered at the coil L1 at point S1. The appertaining signal curves are shown in FIG. 1*a* where it is seen that an additional pulse at 10 occurs at inductor L1 when switch S2 is closed and again at 12 when switch S2 is opened.

An inductively coupled switch is disclosed with the principles illustrated here.

An alternative of this switch derives when a change of the coupling ratio between the coils L1 and L2 occurs in that the coils are moved away from one another or, respectively, in that a corresponding material M is inserted between the coils. The function of the switch S2 can be activated or, respectively, deactivated in this manner. A switch would thus be independent of the coupling ratio. It would then be a matter of an inductive coupling switch.

Figure 1A:
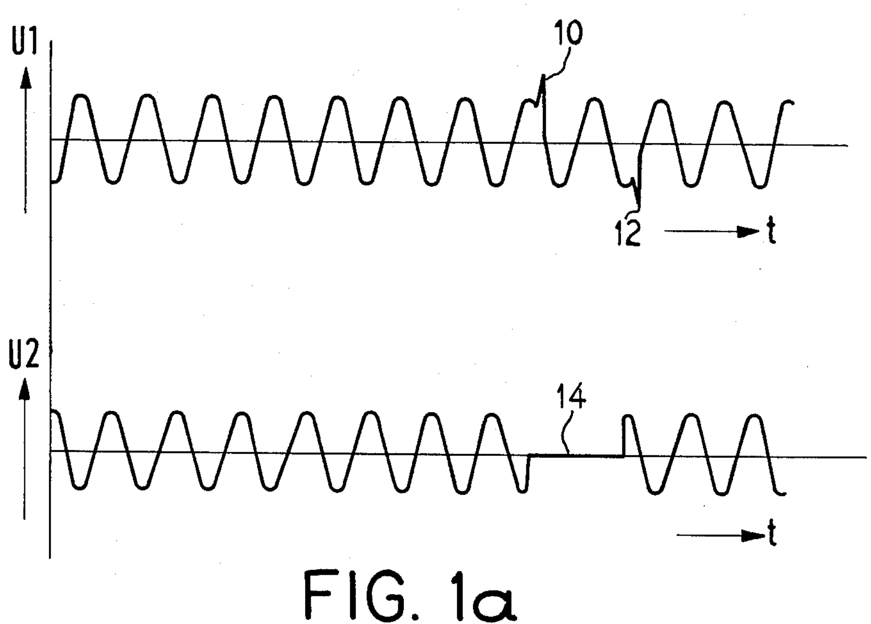
FIG. 1*a* shows the electrical signals present at the inductors of FIG. 1 over time.

As can be seen from the signal curve of FIG. 1*a*, the signal disappears at 14 during the time in which the switch S2 is shorted. If one somehow succeeds in shorting the signal at the switch S2 such that counting the signals at S2 is not simultaneously interrupted, then one succeeds in producing synchronization between the signals. After precisely the $n^{th}$ return of the signal S1 at the side of the coil L1, it is thus possible to close the switch S2 at the side of the coil L2.

Figure 2:
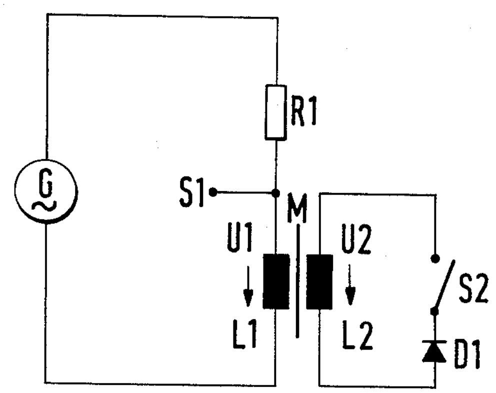
FIG. 2 is an electrical schematic showing an alternative embodiment of the present invention including a diode.
Figure 2A:
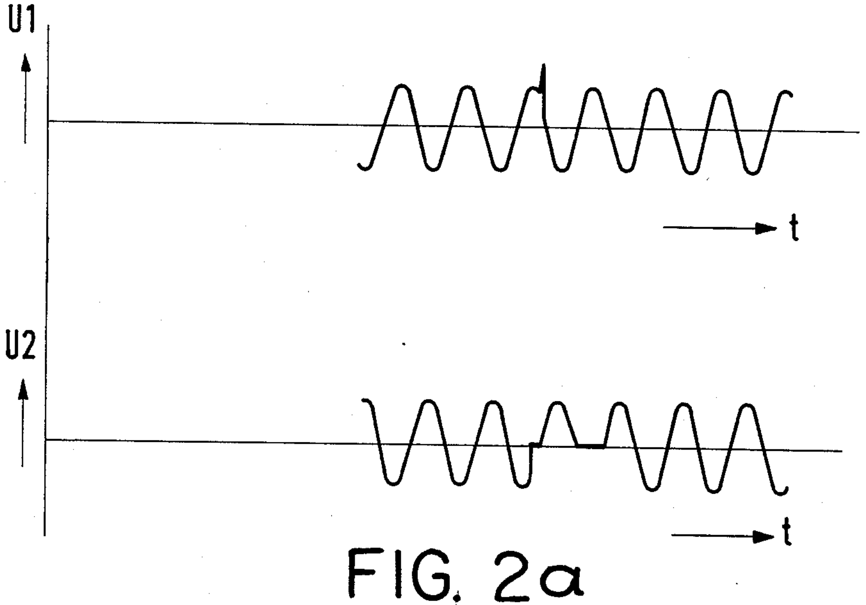
FIG. 2*a* shows the electrical signals present at the inductors of FIG. 2 over time.

This goal can be achieved when, as illustrated in FIG. 2, the short at the coil L2 is executed over a diode D1. In this case, for example, the positive half waves of the signal are not shorted so that they are available for counting. When a count of the positive signal waves is executed at the side of the coil L2, a switch S2 can thus close exactly at a point in time which is prescribed by the signal generation on the side of the coil L1.

When, thus, the frequency is altered on the part of the signal generator, then the frequency on the side of the switch also changes, but the count of the positive half waves remains unaltered so that switching is still always carried exactly at the same wave passage but given a different time differential between the switching events.

Figure 3:
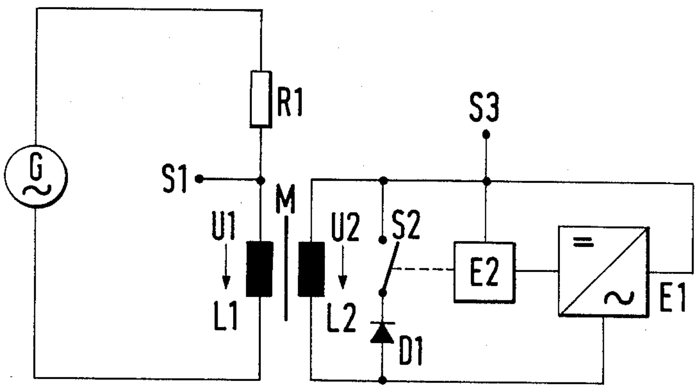
FIG. 3 is an electrical schematic showing an alternative embodiment of the present invention including a synchronization switch built-in and electronics elements.

The principle for resolving the problem initially cited can be derived from the circuit of FIG. 3 which shows the addition of the electronics E2 to the circuits of FIGS. 1 and 2.

This electronics serves to interrogate and count the, for example, positive half waves of the key circuit over the point S3. The electronics E2 contains a coding which determines when the switch S2 is shorted. Of the two signal curves, that of the lock circuit is now no longer determinant but, rather, that of the key circuit is. A short ensues at a specific point in time (after n positive half waves of the signal) and said short can be seen at S1 delayed by $\Delta T$. With this principle, the signals which appeared at the key side are demonstrated to be completely snychronized at S1 and, thus, perceptible.

An electronics component E1 which makes the alternating signal into a DC signal is also provided. The supply power on the side of the key is generated with this component. Here, too, the fact that only the one half wave is briefly cut off makes itself advantageously felt so that no prevasive collapses are felt in the energy supply.

The circuit illustrated in FIG. 3 can also be improved with the object of being able to use the signal as an information carrier in an even more pronounced manner. In accord with the circuit of FIG. 3, the signal of the signal generator is superimposed on the signal generated by the short-circuiting and the object now exists of emphasizing this signal in even a clearer manner in the fundamental signal of the signal generator.

Two ways would be fundamentally conceivable for this. Corresponding signal manipulations can be undertaken both at the part I (key part) as well as the part II (lock part). Any additional outlay which may be undertaken at the moved part (here the key part I) is problematic. All additional manipulations at this part for better signal transmission increase the number of components, and, thus, the energy consumption and the space requirements. Thus, additional outlay should only be exerted at that part which, on the basis of its three-dimensional structure, allows it. On principle, however, the following statements can be related both to part I as well as to part II.

The problem resolution presented here proceeds from the fact that a third coil L3 is incorporated in part II spatially separated from coil L1 such that the electromagnetic influence of the coil L2 no longer comes to bear at the coil L3. When the coil L3 is connected in circuit with the coil L1 in a suitable manner such that the fundamental signals pending at them are completely identical, then all fluctuations from this equality can be clearly identified over a differential amplifier.

Figure 4:
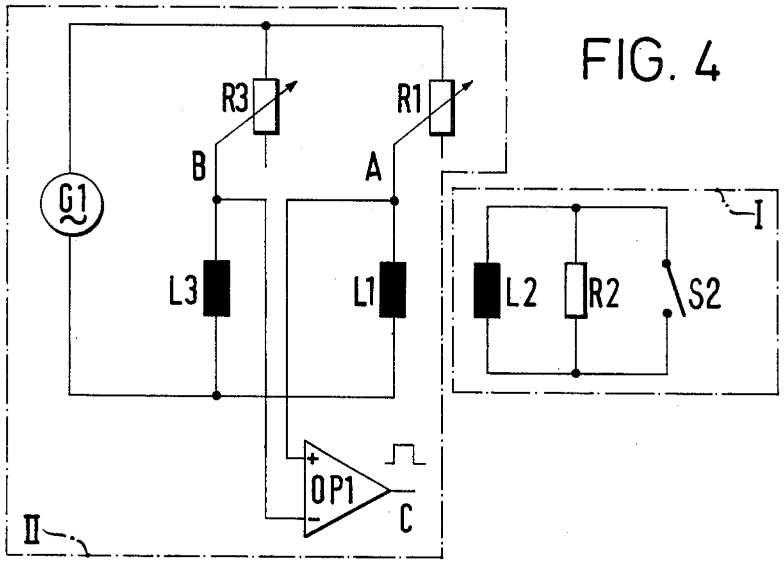
FIG. 4 is an electrical schematic showing an alternative embodiment of the present invention including an additional inductor and an operational amplifier.
Figure 5:
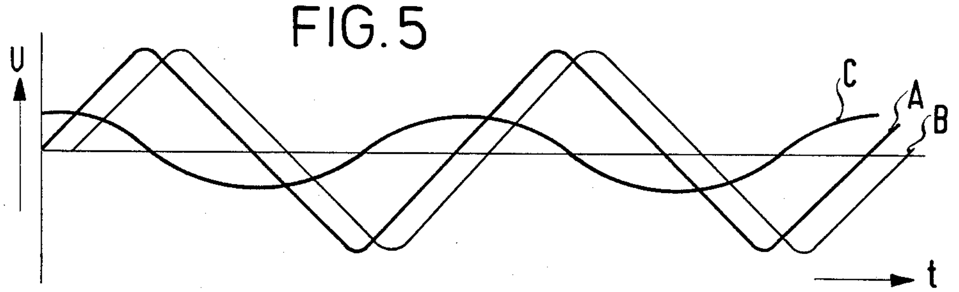
FIG. 5 shows the electrical signals present at the inputs and output of the operational amplifier shown in FIG. 4 when parts I and II are separated.

The resolution of the problem is shown in FIG. 4. The signals as derived when part I is not in the proximity of part II are illustrated in FIG. 5 at points A, B, C. The inductances L1, L3 are matched over the resistors R1, R3 such that they exhibit a phase shift in their signals at points A and B. As the result of the difference between the signals A and B which is adjacent to the input of the operational amplifier OP1, the signal curve C derives as the output signal of the operational amplifier.

When part I approaches part II, the overall inductance will now change signal curve A due to the inductances L1 and L2 now situated close to one another in such manner that, given proper matching of the resistors R1 and R3, the signals A and B precisely superpose or, respectively, in case the coils L1, L3 are oppositely wound, they are phased-shifted by 180°. As a result of the non-existing difference between the signals A and B at the input of the operational amplifier, a signal will no longer appear at the output of the operational amplifier. The C line will be identical with the O line (or, respectively, have a constant value). This is changed for the moment in which the switch S2 is closed. The coil L2 which receives its energy from the coil L1 given an open switch and, accordingly, builds up a voltage at the resistor R2, is shorted; field collapse follows, this immediately influencing the coil L1 and the signal curve as illustrated at TS in FIG. 6 derives. The coil L3 in part II remains uninfluenced by this change due to the switch change in part I since it is at a sufficient spatial distance from the coil L1.

Figure 6:
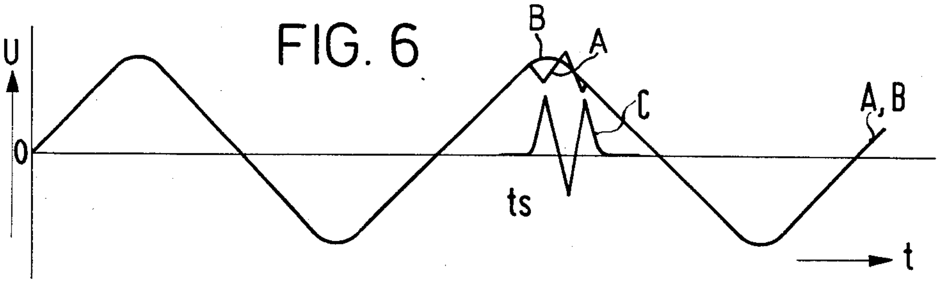
FIG. 6 shows the electrical signal present at the inputs and output of the operational amplifier shown in FIG. 4 when parts I and II are in close proximity.

The operation is correspondingly illustrated in FIG. 6. The two progressions of the curves A and B from FIG. 5 are combined in one curve in FIG. 6. A brief difference between the two signals derives only at the point ts (the point in time at which the switch S2 is closed). Therewith, the input signal of the operational amplifier changes and said operational amplifier emits the signal correspondingly amplified, at its output in the form of the curve progression C. This signal is such a clear imaging of the switch change of S2 that it can be electronically further processed without great difficulty.

The tuning of the circuits in part I and II or, respectively, their matching to one another can also ensue automatically in that the resistors R1, R3 are executed as voltage-regulating resistors. In this case, the output signal of the operational amplifier is employed in order to vary one of the resistors until the output signal has reached a minimum value.

Instead of short-circuiting the coil L2 at the key side by the switch S2, a synchronous switch can also be effected by means of an additional load of L2 by an uncharged capacitor applied to the coil by means of a switch, whereby, however, it must be taken into consideration that the capacitor short-circuit cannot be equated with the greatest conceivable load effected by a switch closing and that the known chronologically exponential decrease of the effect of the capacitor short-circuit cannot be exploited in conjunction with producing a synchronous switch.

By contrast, a feed of energy which is stored in a charged capacitor represents a further possibility of a synchronization measure to be effected over the coil influencing. The capacitor is connected to the coil by means of a switch, whereby the connection times can be determined by the known measures of synchronization, for example counting the half waves.

Figure 7:
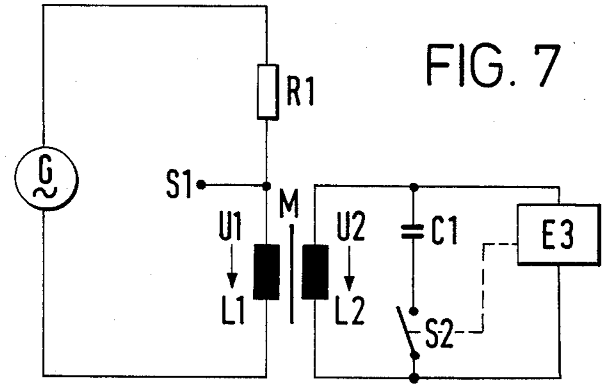
FIG. 7 is an electrical schematic showing an alternative embodiment of the present invention including a circuit for energy impression.
Figure 7A:
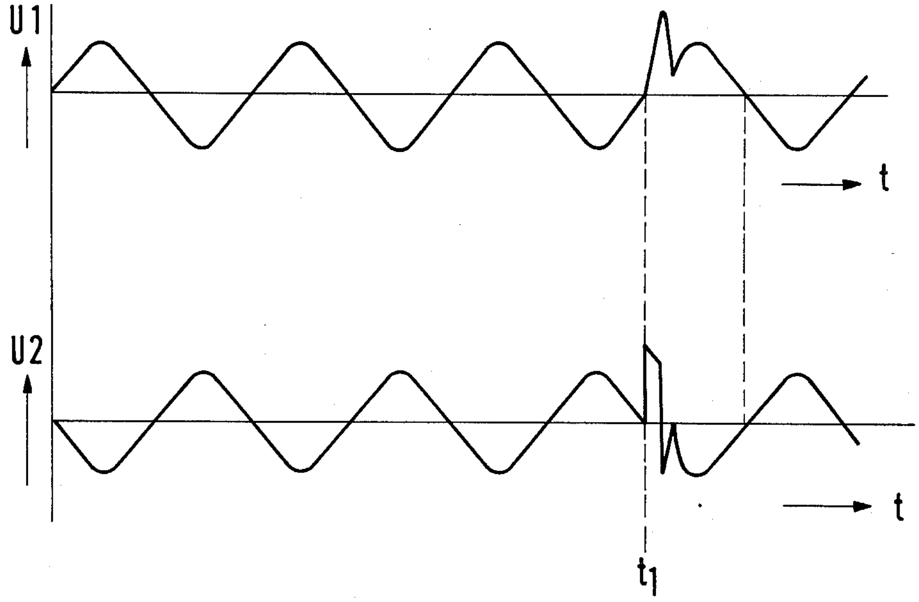
FIG. 7*a* shows the electrical signals at the inductors of FIG. 7.

The principle of the synchronous switch directed to energy feed is illustrated in a sample embodiment in FIG. 7. In accord with this, a capacitor C1 is additionally incorporated into the key circuit, the capacitor being applied to the inductance L2 over the short-circuiting switch S2. The actuation of the short-circuiting switch S2 is controlled over an electronics E3, which comprises a zero crossing detector, so that the charge amounts situated at C1 will be presented at a suitable point in time over the inductance L2 and an effect on the lock coil L1 will be produced due to the current flux thereby occurring. It is obvious that energy is not destroyed by means of this type of short, but rather that energy present in C1 is briefly supplied. This energy feed occurring at time t1 can be seen at the resulting peak in the curve progression of FIG. 7*a*.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. A device for identifying information for access control comprising:

a lock portion having a signal generator for generating a first signal, a first inductance coil connected to receive said first signal from said signal generator, an evaluation circuit connected to receive a second signal from said first inductance coil for comparing said second signal to a reference signal and producing an output when said second signal and said reference signal have a desired relationship therebetween;

a key portion having a second inductance coil capable of being inductively coupled to said first inductance coil, a rectifier element, a switch in series with said rectifier element, said switch and said rectifier element connected across said second inductance coil, means connected to said switch for controlling the operation thereof, said switch control means including counting means for counting signal events across said rectifier;

whereby operation of said switch in said key portion impresses said second signal on said first signal for comparison to said reference signal by said evaluation circuit in said lock portion.

2. A device as claimed in claim 1 wherein said switch control means includes electronics containing a coding for determining the operation of said switch, and means for supplying power to said electronics.

3. A device as claimed in claim 1 further comprising means for superimposing said first signal on said second signal to amplify said second signal for use by said evaluation circuit.

4. A device as claimed in claim 3 wherein said superimposing means includes a third inductance coil in said lock portion disposed spaced from said first coil so that said third coil does not experience inductive influence during inductive coupling of said first and second coils.

5. A device as claimed in claim 4 further comprising a first variable impedance element in series with said first inductance coil, a second variable impedance element in series with said third inductance coil, and a comparator having a first input connected across said first coil and a second input connected across said third coil.

6. A device as claimed in claim 5 wherein at least one of said variable impedance elements is controlled by said comparator to generate a phase difference in the signals across said first and third coils when said key portion is remote from said lock portion and to generate no phase difference when said first and second coils are inductively coupled.

7. A device for identifying information including an evaluation circuit for comparing a signal to a reference and triggering an identification event when the signal and the reference have a desired relationship therebetween comprising:

a lock portion having a signal generator for generating a periodic signal, a first coil, a resistor in series with said first coil, said first coil and said resistor connected across the outputs of said signal generator, a reference point connected to the input of the evaluator circuit; and a key portion having a second coil for inductive coupling with said first coil, a counter connected across said second coil for counting said periodic signal, a capacitance connectable across said second coil, means associated with said counter for controlling the connection of said capacitance across said second coil at points in time determined by said counter to produce a second signal in said lock portion where said second signal is evaluated by the evaluation circuit.

8. A device as claimed in claim 7 further comprising a third coil in parallel with said first coil and means connected across said first and third coils for comparing the signals therethrough, said third coil disposed spatially separated from said first coil so that said third coil is not inductively influenced by said second coil during inductive coupling of said first and second coils.

9. A device for identifying information having an evaluation circuit for comparing a signal to a reference and triggering an identification event when the signal and reference have a desired relationship therebetween, comprising:

a lock portion having a signal generator for generating a periodic signal, a first coil, a resistor in series with said first coil, said first coil and said resistor connected across the outputs of said signal generator, a reference point connected to the input of the evaluation circuit; and a key portion having a second coil for inductive coupling with said first coil, means connectable across said first coil for short-circuiting said second coil for at least a portion of said periodic signal, means for counting said periodic signal controlling connection of said short-circuiting means at points in time determined by said counting means, whereby connection of said short-circuiting means across said second coil alters said periodic signal, said altered signal being evaluated by the evaluating circuit.

* * * * *